April 24, 1928.

J. N. SMITH 1,667,445

SNOWPLOW

Filed June 25, 1926

Witnesses
C. L. McDonald
E. N. Lovewell

Inventor
James N. Smith

By

Attorney

April 24, 1928. 1,667,445
J. N. SMITH
SNOWPLOW
Filed June 25, 1926 2 Sheets-Sheet 2
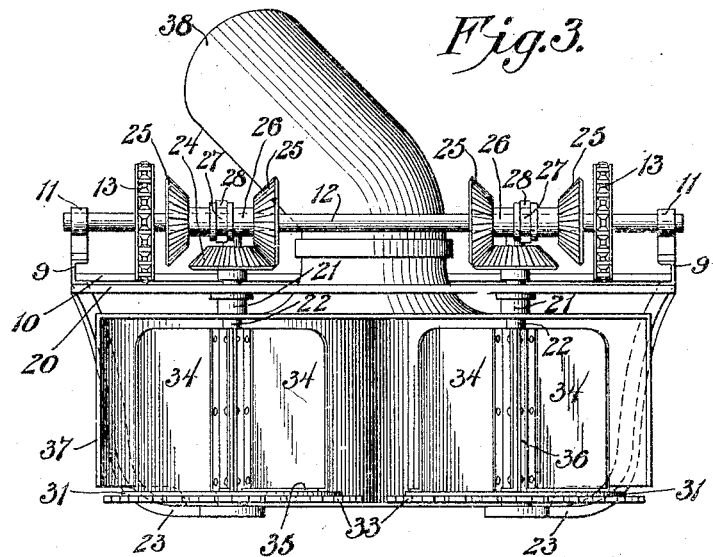
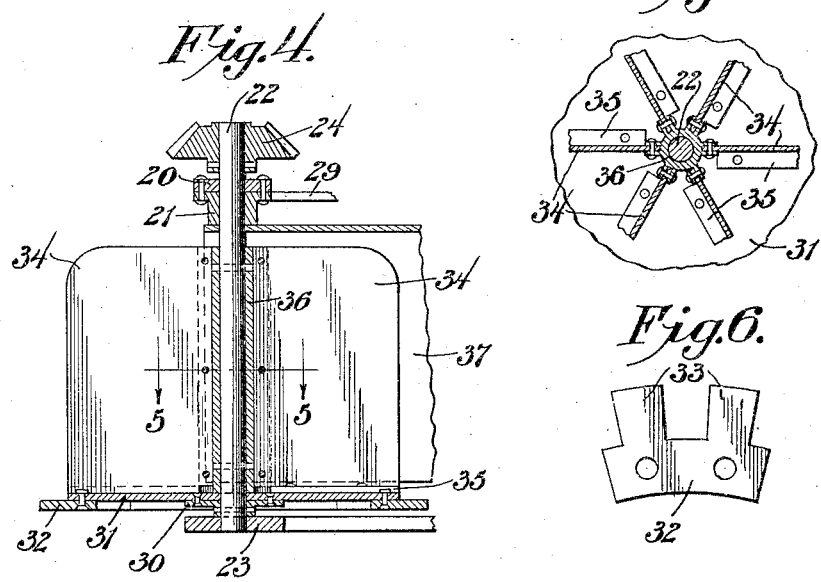
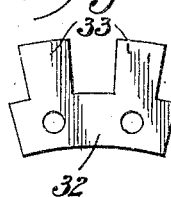
Witnesses
C. L. McDonald
E. N. Lovewell
Inventor
James N. Smith
By
*[signature]*
Attorney Patented Apr. 24, 1928.

1,667,445

UNITED STATES PATENT OFFICE.

JAMES N. SMITH, OF BONAIR, IOWA.

SNOWPLOW.

Application filed June 25, 1926. Serial No. 118,552.

This invention relates to a snow plow, which is adapted to form part of a motor vehicle built for the purpose, or which may be in the form of an attachment for a motor truck, locomotive, street car, or the like.

The object of the invention is to provide a plow of the rotary type, which is adapted to operate efficiently under all conditions and clear the snow from the highway or railroad, regardless of whether the snow is light or heavy, dry or wet, soft or partially frozen.

The specific construction of the invention and the advantages of the same will be more fully explained in connection with the accompanying drawings, which illustrate the same in its preferred form.

In the drawings:

Figure 1 is a vertical longitudinal section of the invention.

Figure 2 is a plan view thereof with a portion of the casing broken away.

Figure 3 is a front elevation.

Figure 4 is a vertical longitudinal section through one of the fans, and the cutter to which the fan is attached.

Figure 5 is a fragmentary section taken on the line 5—5 of Figure 4.

Figure 6 is a detail view of one of the cutter elements detached.

The invention, as herein shown and described, is supported by longitudinal bars 9, which are connected by a platform 10, and which may constitute part of a motor vehicle, or an attachment therefor. At the forward ends of the bars 9 are bearings 11, in which is journaled a transverse shaft 12. Sprocket wheels 13 are secured on this shaft, and are driven by sprocket chains 14 from sprocket wheels 15 secured on a countershaft 16, journaled in bearings 17, mounted on the bars and the platform 10. A sprocket wheel 18 is secured to the countershaft 16 and driven by a sprocket chain 19, leading from the motor.

A transverse rail 20 connects the forward ends of the bars 9, and secured to this rail are bearings 21, in which the respective cutter shafts 22 are journaled. The lower ends of the cutter shafts are rotatively supported in the lower ends of braces 23, which are secured to the side bars 9, and extend downwardly and forwardly therefrom. Each cutter shaft 22 has a beveled gear 24 secured to its upper end, which is adapted to be driven in either direction by beveled gears 25, keyed to the shaft 12. Each pair of beveled gears 25 is connected by a sleeve 26, having a peripheral groove 27 for receiving the forked end of a hand lever 28, which is pivotally supported on an arm 29 secured to the rail 20, and may be actuated to shift the gears 25 to forward, reverse or neutral position.

A collar 30 is secured to the lower end of each cutter shaft 22, and bolted or riveted to this collar is a horizontal disk 31, to which cutter sections 32 are removably secured. Each cutter section is provided with two cutting blades 33, and the sections may be removed for sharpening the blades, or for replacing the same when broken.

A series of vertical radial fan blades 34 are mounted above each cutter supporting disk 31, each fan blade being provided at its lower edge with a flange 35 secured to the disk 31, and being secured at its inner edge to a sleeve 36, which is secured to the shaft 22. The fan blades 34 are partly housed within a casing 37, which is located just above the cutter supporting disks 31, and which extends rearwardly and upwardly. A curved chute 38 is connected to the upper rear end of the casing 37, and may be swung about a vertical axis so as to discharge the snow toward either side of the road.

In the operation of the snow plow, as the vehicle advances, the shafts 22, carrying the cutters and fans, will be rotated rapidly. The cutters are located close to the surface of the road, and will effectually remove the snow therefrom, even when the same is hard and frozen, or icy. The ice and snow, even though it may be comparatively heavy, will be immediately carried rearwardly by the rapidly revolving fan blades 34, and will be immediately discharged through the chute 38. Each wheel or disk 31 may be operated in either direction, independently of the other. This features adapts the device for operating under varying conditions, and may be so utilized as to prevent the snow or ice from clogging within the casing.

While I have shown and described the specific construction of the invention in one form in which it may be embodied, it is to be understood that the various details thereof may be considerably modified without any material departure from the salient features of the invention as claimed.

What is claimed is:

1. In a snow plow, the combination of a plurality of vertical shafts, each with a horizontally disposed disk secured to its lower end, cutter sections removably secured to the edge of the disk, fan blades secured radially of each shaft and with their lower edges secured to the disk, means for rotating said shafts, and a casing for receiving the snow and ice from the fans and directing it to the side of the roadway.

2. In a snow plow, the combination of a plurality of vertical shafts, each with a horizontally disposed disk secured to its lower end, cutter sections removably secured to the edge of the disk, fan blades secured radially of each shaft and with their lower edges secured to the disk, means for rotating either shaft independently in either direction, and a casing for receiving the snow and ice from the fans and directing it to the side of the roadway.

3. In a device of the character described, the combination of a plurality of rotatable fans having vertically disposed blades; horizontally disposed cutters removably secured to the lower ends of the fans; means for rotating the fans independently in either direction; a substantially V-shaped casing for receiving the snow from the fans; and a chute for directing the snow to either side of the roadway.

4. In a snow plow, the combination of a plurality of horizontally disposed disks capable of rotation in either direction; cutter sections removably secured to the edges of the disks; vertical fan blades secured to the disks above the cutter sections; a substantially V-shaped casing for receiving the snow from the fans; and means for directing the snow to either side of the roadway.

In testimony that I claim the foregoing as my own, I have hereto affixed my signature.

JAMES N. SMITH.